(12) United States Patent
Park

(10) Patent No.: US 12,327,883 B2
(45) Date of Patent: Jun. 10, 2025

(54) BATTERY PACK CONNECTOR

(71) Applicant: SAMSUNG SDI CO., LTD., Yongin-si (KR)

(72) Inventor: Seokryun Park, Yongin-si (KR)

(73) Assignee: SAMSUNG SDI CO., LTD., Yongin-si (KR)

( * ) Notice: Subject to any disclaimer, the term of this patent is extended or adjusted under 35 U.S.C. 154(b) by 259 days.

(21) Appl. No.: 18/099,511

(22) Filed: Jan. 20, 2023

(65) Prior Publication Data

US 2023/0238660 A1 Jul. 27, 2023

(30) Foreign Application Priority Data

Jan. 27, 2022 (KR) .................. 10-2022-0012590

(51) Int. Cl.
*H01M 50/503* (2021.01)
*H01R 12/77* (2011.01)

(52) U.S. Cl.
CPC ........ *H01M 50/503* (2021.01); *H01R 12/771* (2013.01)

(58) Field of Classification Search
CPC ............ H01M 50/503; H01M 50/284; H01M 10/425; H01M 50/519; H01M 50/296; H01M 50/202; H01R 12/771; Y02E 60/10

See application file for complete search history.

(56) References Cited

U.S. PATENT DOCUMENTS

| | | | |
|---|---|---|---|
| 2009/0136837 A1* | 5/2009 | Komoto | H01M 10/425 264/261 |
| 2010/0066307 A1 | 3/2010 | Kim | |
| 2014/0285990 A1* | 9/2014 | Kim | H05K 1/111 174/268 |
| 2021/0052222 A1 | 2/2021 | Chahine et al. | |
| 2023/0216146 A1 | 7/2023 | Park | |

FOREIGN PATENT DOCUMENTS

| | | |
|---|---|---|
| EP | 2169757 A2 | 9/2009 |
| EP | 2544263 A1 | 7/2012 |
| JP | 2021-510000 A | 4/2021 |
| KR | 10-2010-0032821 A | 3/2010 |
| KR | 10-2014-0116662 A | 10/2014 |
| KR | 10-2018-0084462 A | 7/2018 |

OTHER PUBLICATIONS

European Search Report issued Jun. 23, 2023, for corresponding EP Patent Application No. 23152944.7.
Korean Office Action dated Jul. 15, 2024 for corresponding KR Patent Application No. 10-2022-0012590.

* cited by examiner

*Primary Examiner* — Jean F Duverne
(74) *Attorney, Agent, or Firm* — Lee IP Law, P.C.

(57) ABSTRACT

A connector of a battery pack includes first pads at both sides of one end of the connector, and second pads at both sides of another end of the connector, wherein the first pads are in contact with each of first and second open portions, and the second pads are in contact with each of third and fourth open portions.

9 Claims, 4 Drawing Sheets

BATTERY PACK CONNECTOR

CROSS-REFERENCE TO RELATED APPLICATION

This application is based on and claims priority under 35 U.S.C. § 119 to Korean Patent Application No. 10-2022-0012590, filed on Jan. 27, 2022, in the Korean Intellectual Property Office, the disclosure of which is incorporated by reference herein in its entirety.

BACKGROUND

1. Field

One or more embodiments relate to a connector of a battery pack.

2. Description of the Related Art

Typically, secondary batteries are chargeable and dischargeable batteries, unlike primary batteries. Secondary batteries may be used as an energy source for mobile devices, electric vehicles, hybrid vehicles, electric bicycles, uninterruptible power supply units, and the like. Secondary batteries may be used in the form of a single battery, or in the form of a module or pack of a multiple of batteries connected in one unit, depending on the types of external devices to which the secondary batteries are to be employed.

A battery pack may include a protection circuit module (PCM) to protect secondary batteries from issues, such as a short-circuit, an open-circuit, an overcurrent, an overvoltage, etc., that may be generated during charging/discharging.

SUMMARY

Embodiments are directed to a connector of a battery pack, the connector comprising first pads at opposing sides with respect to an open portion of the connector, the first pads being at one end of the connector; and comprising second pads at opposing sides with respect to an open portion of the connector, the second pads being at another end of the connector, wherein the first pads are in contact with each of first and second open portions, and the second pads are in contact with each of third and fourth open portions The connector may further include third pads that are toward an inside with respect to the first pads, the third pads being symmetrical at both sides of the first pads, wherein the third pads are each spaced apart from a fifth open portion by a first distance.

Each of the third pads may be smaller than each of the first pads, and the third pads may be engaged with one of the outer lines of the first pads.

The third pads may be spaced apart from each of the fifth open portion and a seventh open portion.

The connector may further include fourth pads located toward an inside with respect to the second pads, the fourth pads being symmetrically arranged at both sides of the second pads. The fourth pads may each be paced apart from a sixth open portion by a second distance.

Each of the fourth pads may be smaller than each of the second pads, and the fourth pads may engage with one of outer lines of the second pads. The fourth pads may each be spaced apart from each of a fifth open portion and the sixth open portion The first pads may each have a rectangular shape that form first and second boundary lines respectively with the first and second open portions According to one or more embodiments, a connector of a battery pack includes first pads arranged at opposing sides with respect to an open portion of the connector, the first pads being at one end of the connector, and second pads arranged at opposing sides of another end of the connector, wherein the first pads are in contact with each of first and second open portions, and the second pads are in contact with each of third and fourth open portions.

The connector may further include third pads arranged inside the first pads that are symmetrically arranged at both sides, wherein the third pads are each spaced apart from a fifth open portion by a first distance.

Each of the third pads may be smaller than each of the first pads, and the third pads may be arranged to be engaged with one of outer lines of the first pads.

The third pads may each be spaced apart from each of the fifth open portion and a seventh open portion.

The connector may further include fourth pads arranged inside the second pads that are symmetrically arranged at both sides, wherein the fourth pads are each spaced apart from a sixth open portion by a second distance.

Each of the fourth pads may be smaller than each of the second pads, and the fourth pads may be arranged to be engaged with one of outer lines of the second pads.

The fourth pads may each be spaced apart from each of a fifth open portion and the sixth open portion.

The first pads may each be formed in a rectangular shape to form first and second boundary lines respectively with the first and second open portions.

The second pads may each be formed in a rectangular shape to form third and fourth boundary lines respectively with the third and fourth open portions.

Other aspects, features, and advantages than those described above will become apparent from the following drawings, claims, and detailed description of the disclosure.

BRIEF DESCRIPTION OF THE DRAWINGS

Features will become apparent to those of skill in the art by describing in detail exemplary embodiments with reference to the attached drawings in which.

DETAILED DESCRIPTION

Figure 1:
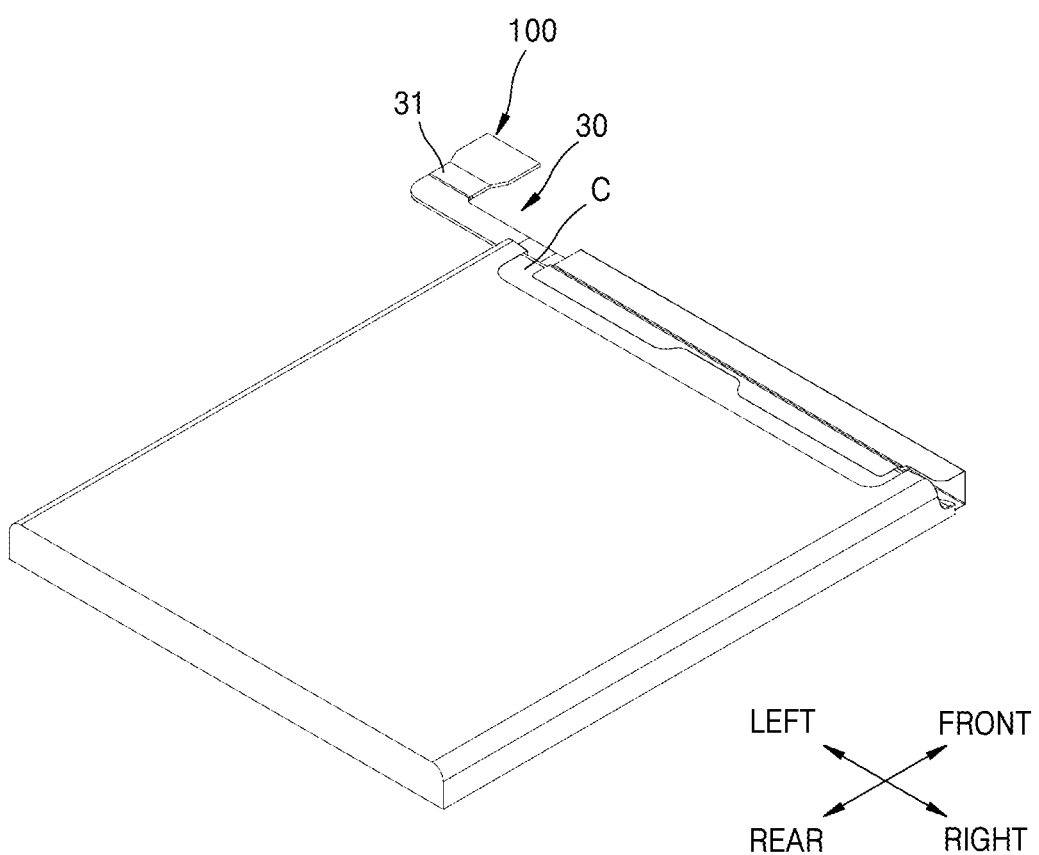
FIG. 1 is a perspective view of a battery pack according to an embodiment.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

In the drawing figures, the dimensions of layers and regions may be exaggerated for clarity of illustration. It will also be understood that when a layer or element is referred to as being "on" another layer or substrate, it can be directly on the other layer or substrate, or intervening layers may also be present. Further, it will be understood that when a layer is referred to as being "under" another layer, it can be directly under, and one or more intervening layers may also be present. In addition, it will also be understood that when a layer is referred to as being "between" two layers, it can be the only layer between the two layers, or one or more intervening layers may also be present. Like reference numerals refer to like elements throughout.

As used herein, the terms "or" and "and/or" are not exclusive terms, and include any and all combinations of one or more of the associated listed items. Expressions such as "at least one of," when preceding a list of elements, modify the entire list of elements and do not modify the individual elements of the list.

Hereinafter, a connector of a battery pack according to an embodiment is described below with reference to FIGS. 1 and 2.

FIG. 1 is a perspective view of a battery pack according to an embodiment. FIG. 2 is an exploded perspective view of a battery pack according to an embodiment.

Figure 2:
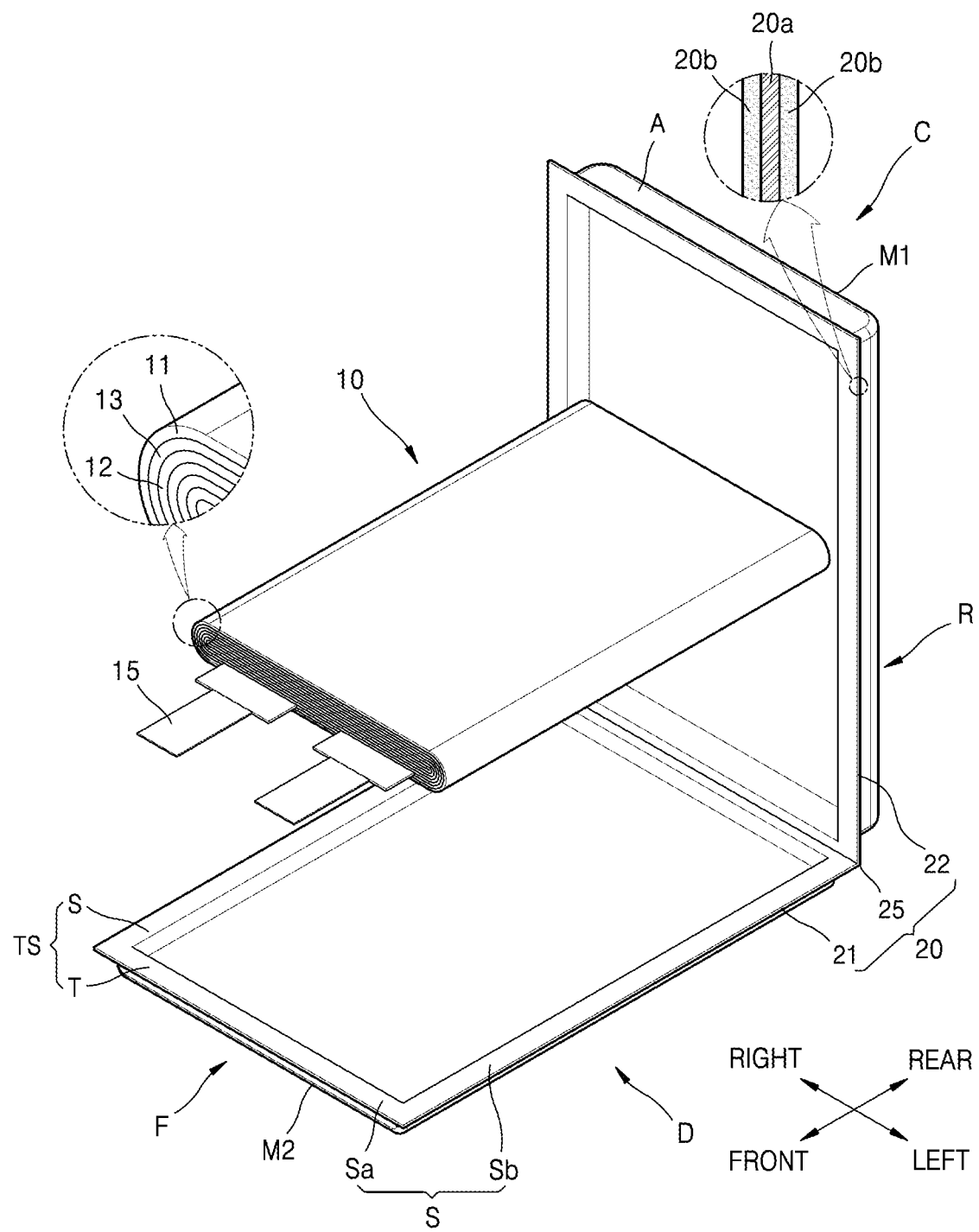
FIG. 2 is an exploded perspective view of a battery pack according to an embodiment.

Referring to FIGS. 1 and 2, a connector of a battery pack according to an embodiment includes a battery cell C. The battery cell C may include an accommodation portion A for accommodating an electrode assembly 10, and a sealing portion TS extending along the edge of the accommodation portion A to seal the accommodation portion A. The electrode assembly 10 may be formed in the form of a roll by winding first and second electrode plates 11 and 12 arranged to face each other with a separator 13 therebetween, or in the form of a stack created by stacking a plurality of first and second electrode plates 11 and 12 with the separator 13 therebetween.

An electrode tab 15 forming a charging/discharging path may be connected to the electrode assembly 10. The electrode tab 15 may include to two electrode tabs having different polarities and electrically connected to the electrode assembly 10. The electrode tab 15 connected to the electrode assembly 10 in the accommodation portion A may be led out to the outside through a front surface F of the accommodation portion A.

The accommodation portion A that accommodates the electrode assembly 10 may be formed in an approximately rectangular parallelepiped shape. In detail, the accommodation portion A may include the front surface F through which the electrode tab 15 is led out, a rear surface R opposite to the front surface F, a pair of main surfaces M1 and M2 connecting the front surface F to the rear surface R and occupying a relatively large area, and a pair of side surfaces D connecting the front surface F to the rear surface R and occupying a relatively small area.

The main surfaces M1 and M2 may occupy the largest area among the surfaces of the accommodation portion A, by occupying an area larger than each of the front surface F, the rear surface R, and the side surfaces D. The front surface F, the rear surface R, and the pair of side surfaces D may be connected to the main surfaces M1 and M2 at different edges along the main surfaces M1 and M2 of the accommodation portion A. In an embodiment, the main surfaces M1 and M2 and the side surfaces D may each be formed in a pair at positions facing each other. For example, the main surfaces M1 and M2 may include first and second main surfaces M1 and M2 facing each other.

The battery cell C may further include the sealing portion TS formed along the edge of the accommodation portion A to seal the accommodation portion A. The accommodation portion A that accommodates the electrode assembly 10 and the sealing portion TS that seals the accommodation portion A may be formed from an exterior member 20 that is continuously formed to surround the electrode assembly 10. In other words, the exterior member 20 may form the accommodation portion A that accommodates the electrode assembly 10 while surrounding the electrode assembly 10, and an extra portion of the exterior member 20 after forming the accommodation portion A may form the sealing portion TS that seals the accommodation portion A.

The exterior member 20 may be formed as a flexible exterior member such as a pouch, and in detail, may include a metal layer 20a, such as an aluminum thin plate, and an insulating layer 20b, such as a resin coating layer, formed on both sides of the metal layer 20a. In this state, the metal layer 20a may be exposed to the outside through a cross-section where the exterior member 20 ends. As described below, the metal layer 20a may be exposed through the edge of the sealing portion TS that is obtained when the first and second exterior members 21 and 22 are combined to face each other with the electrode assembly 10 therebetween.

In an embodiment, the exterior member 20 may include the first and second exterior members 21 and 22 that are combined to face each other with the electrode assembly 10 therebetween. When the electrode assembly 10 is provided between first and second exterior members 21 and 22, the first and second exterior members 21 and 22 may be folded to overlap each other through a folding portion 25 that connects the first and second exterior members 21 and 22 to each other. Then, portions contacting each other along edge areas of the first and second exterior members 21 and 22 may be combined to each other by heat fusion or the like. The inner areas of the first and second exterior members 21 and 22 facing each other with the electrode assembly 10 therebetween may provide the accommodation portion A. The edge areas of the first and second exterior members 21 and 22 combined to each other may provide the sealing portion TS.

The sealing portion TS may be continuously formed along the edge areas of the first and second exterior members 21 and 22. In, the sealing portion TS may be present continuously along the side portions of the first and second exterior members 21 and 22, except along the folding portion 25. In detail, the sealing portion TS may include a terrace portion T extending in a direction toward the front surface F of the accommodation portion A, and may include a side sealing portion S extending in a direction toward the side surfaces D of the accommodation portion A. In this state, the electrode tab 15 connected to the electrode assembly 10 in the accommodation portion A may be led out to the outside of the accommodation portion A through the terrace portion T extending in a direction toward the front surface F of the accommodation portion A. A protection circuit module 30 may be placed on the terrace portion T. The electrode tab 15 led out through the terrace portion T may be bent to be connected to the protection circuit module 30 placed on the terrace portion T.

The side sealing portion S may include a main body Sb of the side sealing portion S at a position corresponding to the accommodation portion A, and a front end portion Sa of the side sealing portion S extending from the main body Sb of the side sealing portion S toward a position deviated from the accommodation portion A. The side sealing portion S may be folded toward the accommodation portion A to reduce the total area occupied by the battery cell C, and as shown below, the side sealing portion S may be folded toward the accommodation portion A through primary folding and secondary folding. For example, in the primary folding, the main body Sb of the side sealing portion S at the position corresponding to the accommodation portion A, and the front end portion Sa of the side sealing portion S at the position deviated from the accommodation portion A, may be folded upward together. After the primary folding, the second folding may be performed, in which the front end portion Sa of the side sealing portion S deviated from the accommodation portion A is folded to be concavely led in toward a corner where the front surface F of the accommodation portion A and the terrace portion T contact each other. Through the primary folding and the secondary folding, the main body Sb of the side sealing portion S may be folded upward toward the side surfaces D of the accommodation portion A and arranged on the side surfaces D of the accommodation portion A to be adjacent thereto, and among the side sealing portion S, the front end portion Sa of the side sealing portion S at a position deviated from the accommodation portion A may form a dog ear as a result of being concavely led in toward the corner formed by the front surface F of the accommodation portion A and the terrace portion T.

The metal layer 20a may be exposed through the edge of the side sealing portion S and through a cross-section where the exterior member 20 forming the side sealing portion S ends. when the main body Sb of the side sealing portion S is folded on the side surfaces D of the accommodation portion A, the metal layer 20a that is exposed through the edge of the main body Sb of the side sealing portion S may not protrude from the side surfaces D of the accommodation portion A. When the front end portion Sa of the side sealing portion S is folded to be concavely led in toward the corner formed by the front surface F of the accommodation portion A and the terrace portion T, the metal layer exposed through the edge of the front end portion Sa of the side sealing portion S may not protrude from the front surface F of the accommodation portion A. In other words, when the main body Sb of the side sealing portion S is folded on the side surfaces D of the accommodation portion A, and the front end portion Sa of the side sealing portion S is folded toward the corner where the terrace portion T and the front surface F of the accommodation portion A contact each other. The side sealing portion S may not protrude from the side surfaces D of the accommodation portion A and the front surface F of the accommodation portion A, and may be folded in a shape corresponding to the appearance of the accommodation portion A.

In an embodiment, the appearance of the battery cell C may generally follow the appearance of the accommodation portion A, and the outer surface of the accommodation portion A. The front surface F, the rear surface R, the main surfaces M1 and M2, and the side surfaces D of the accommodation portion A may substantially provide the outer surfaces of the battery cell C, for example, a front surface, a rear surface, a main surface, and side surfaces of the battery cell C. For example, the battery cell C may further include the sealing portion TS sealing the accommodation portion A, with the accommodation portion A for accommodating the electrode assembly 10. In this state, to reduce the area occupied by the battery cell C, the sealing portion TS, that is, at least the side sealing portion S, may be folded toward the side surfaces D of the accommodation portion A and the front surface F, the appearance of the battery cell C may generally follow the appearance of the accommodation portion A. Accordingly, the front surface F, the rear surface R, the main surfaces M1 and M2, and the side surfaces D of the accommodation portion A may substantially provide the front surface, the rear surface, the main surface, and the side surfaces of the battery cell C. For example, the terrace portion T may be formed at a front position of the battery cell C. The terrace portion T may be formed generally in the form of a plate shape rather than in a surface shape so that the protection circuit module 30 may be placed thereon. When the appearance of the battery cell C is an approximately rectangular parallelepiped shape, the front surface of the battery cell C may provide the front surface F of the accommodation portion A.

Figure 3:
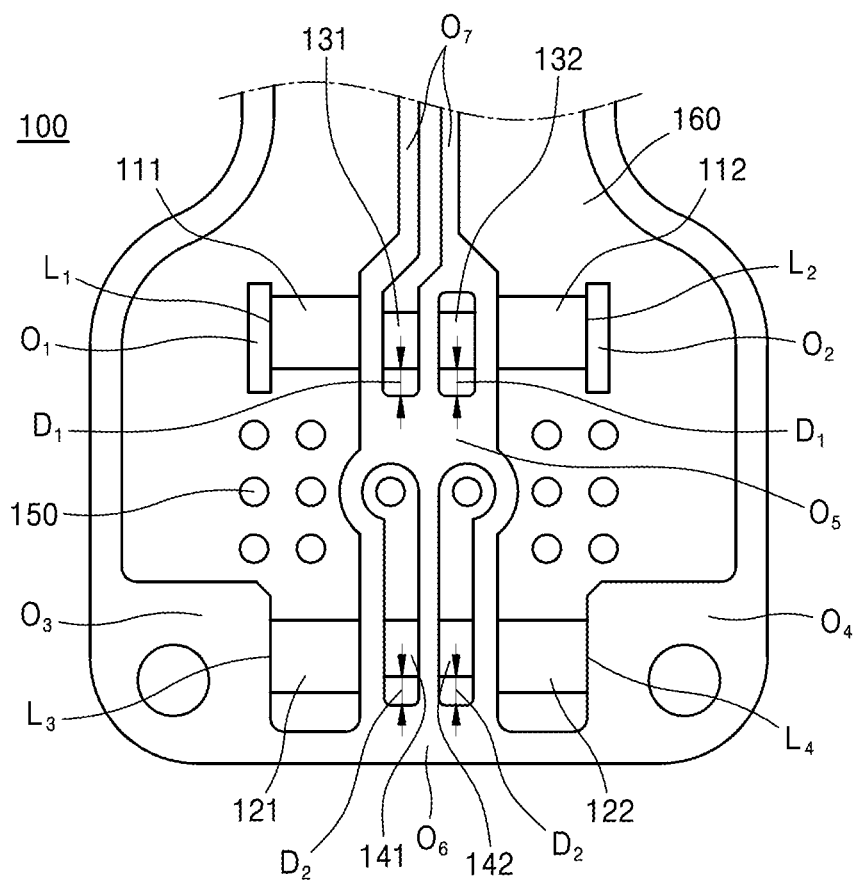
FIG. 3 is a plan view of a connector according to an embodiment.

A connector structure according to an embodiment is described below with reference to FIGS. 3 and 4. Any content that is not disclosed in FIGS. 3 and 4 may be referred to in the contents described above.

A connector 100 of a battery pack according to an embodiment may be arranged, as illustrated in FIG. 1, on a flexible circuit board 31 arranged in the protection circuit module 30. The connector 100 may be connected to the connector 100 of another battery pack.

In this state, the connector 100 may include first pads 111 and 112 arranged at both sides of one end of the connector 100 and second pads 121 and 122 arranged at both sides of the other end of the connector 100. The first pads 111 and 112, respectively, may be in contact with first and second open portions $O_1$ and $O_2$. The second pads 121 and 122, respectively, may be in contact with third and fourth open portions $O_3$ and $O_4$.

In addition to the pad portion and the open portion, the connector 100 may include a plating portion 160 formed in a plating pattern and a terminal portion 150 for power connection.

As in the present embodiment, the first and second open portions $O_1$ and $O_2$ in a PI (polyimide) film open structure may contact the first pads 111 and 112 arranged at both sides. The first pads 111 and 112 may be in contact with the first and second open portions $O_1$ and $O_2$, while maintaining a rectangular shape. In detail, the first pads 111 and 112 may have a rectangular shape to form the first and second boundary lines L1 and L2 respectively with the first and second open portions $O_1$ and $O_2$. The overall rigidity of the connector 100 may be improved through the shape and arrangement structure of the first pads 111 and 112. In an implementation, the shear strength and tensile strength of the connector 100 may be improved.

Also, the third and fourth open portions $O_3$ and $O_4$ arranged at both sides may be formed in contact with the second pads 121 and 122, respectively. In an implementation, the second pads 121 and 122 may have a rectangular shape to form third and fourth boundary lines L3 and L4 respectively with the third and fourth open portions $O_3$ and $O_4$. As described above, the overall rigidity of the connector 100 may be improved through the shape and arrangement structure of the first pads 111 and 112, and the shear strength and tensile strength of the connector 100 may be improved.

According to the present embodiment, the connector 100 may include third pads 131 and 132 arranged toward an inside with respect to the first pads 111 and 112, the first pads 111 and 112 being symmetrically arranged at both sides of the third pads 131 and 132. The third pads 131 and 132 may be formed in a rectangular shape smaller than the first pads 111 and 112. In this state, the third pads 131 and 132 may be arranged in parallel to be engaged with one of outer lines of the first pads 111 and 112. Accordingly, the first pads 111 and 112 may support the outside of the connector 100, and the third pads 131 and 132 may support the inside of the connector 100.

The third pads 131 and 132 may each be spaced apart from a fifth open portion $O_5$ by a first distance D1. In detail, the third pads 131 and 132 may each be spaced apart from the fifth open portion $O_5$ and a seventh open portion $O_7$, respectively. As such, the overall rigidity of the connector 100 may be improved though the structure in which the third pads 131 and 132 are each spaced apart from the fifth open portion $O_5$ and the seventh open portion $O_7$ on both sides. Accordingly, the shear strength and tensile strength of the connector 100 may be improved.

According to the present embodiment, the connector 100 may include fourth pads 141 and 142 arranged toward an inside the second pads 121 and 122, which are symmetrically arranged at both sides. The fourth pads 141 and 142 may be formed in a rectangular shape smaller than the second pads 121 and 122. In this state, the fourth pads 141 and 142 may be arranged in parallel to be engaged with one outer line among the outer lines of the second pads 121 and 122. Accordingly, the second pads 121 and 122 may support the outside of the connector 100, and the fourth pads 141 and 142 may support the inside of the connector 100.

The fourth pads 141 and 142 may each be spaced apart from a sixth open portion $O_6$ by a second distance D2. In detail, the fourth pads 141 and 142 may each be spaced apart from the fifth open portion $O_5$ and the sixth open portion $O_6$. As such, the overall rigidity of the connector 100 may be improved through the structure in which the fourth pads 141 and 142 are each spaced apart from the fifth open portion $O_5$ and the sixth open portion $O_6$ at both sides. In other words, the shear strength and tensile strength of the connector 100 may be improved.

Figure 4:
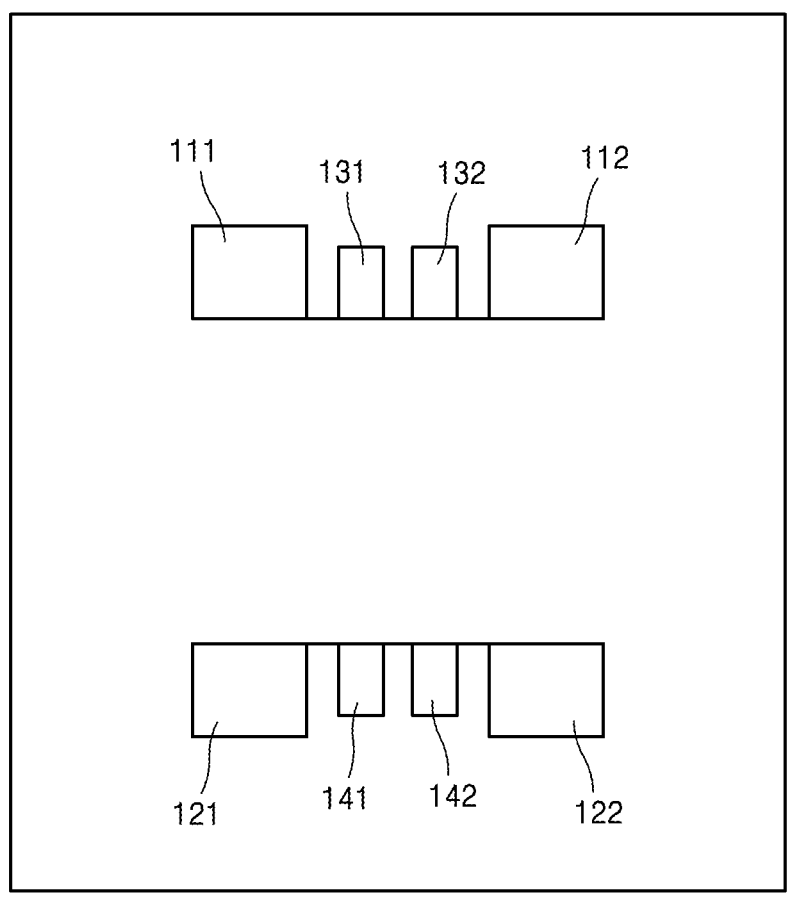
FIG. 4 is a view showing the arrangement of pads according to an embodiment.

Referring to FIG. 4, the first, second, third, and fourth pads may all be in a rectangular shape and spaced apart from each other. In this state, the first and second pads may be arranged symmetrically with respect to each other in one direction as a length direction. The third and fourth pads may be arranged symmetrically with respect to each other in the other direction perpendicular to the one direction as a length direction.

The shear strength and tensile strength of the connector 100 according to the present embodiment may be improved through the above pad arrangement structure of the connector 100. Also, a process capability index (CPK) of the connector 100 with respect to the same area may be improved. Also, due to the improvement of rigidity of the connector 100, during attachment and detachment, breakage and damage to the connector 100 may be reduced.

Furthermore, the connecting lines, or connectors shown in the various figures presented are intended to represent functional relationships and/or physical or logical couplings between the various elements. It should be noted that many alternative or additional functional relationships, physical connections or logical connections may be present in a practical device. Moreover, no item or component is essential to the practice of the disclosure unless the element is specifically described as "essential" or "critical."

The use of the terms "a" and "an" and "the" and similar referents in the context of describing the disclosure are to be construed to cover both the singular and the plural. Furthermore, recitation of ranges of values herein are merely intended to serve as a shorthand method of referring individually to each separate value falling within the range, unless otherwise indicated herein, and each separate value is incorporated into the specification as if it were individually recited herein.

Furthermore, the steps of all methods described herein can be performed in any suitable order unless otherwise indicated herein or otherwise clearly contradicted by context.

The disclosure is not limited to the described order of the steps. The use of any and all examples, or language (e.g., "such as") provided herein, is intended merely to better illuminate the disclosure and does not pose a limitation on the scope of the disclosure unless otherwise claimed.

Furthermore, numerous modifications and adaptations will be readily apparent to one of ordinary skill in the art without departing from the spirit and scope of the disclosure.

By way of summation and review, a protection circuit module may include a plexible printed circuit board (FPCB) coupled to a battery module, A connector may be mounted on the FPCB.

In such a protection circuit module, there may be a possibility that the connector could be detached by a physical force during assembling and disassembling with respect to a connector of a counterpart battery module. The thickness and plating of a FPCB may be relatively thin, and accordingly, there may be a high risk of breakage of the connector mounted on the FPCB. In such a protection circuit module, there may be a possibility that the cone tor could be detached by a physical force during assembling and disassembling with respect to a connector of a counterpart battery module. The thickness and plating of a FPCB may be relatively thin, and accordingly, there may be a high risk of breakage of the connector mounted on the FPCB In the connector of a battery pack according to an embodiment, the shear strength and tensile strength of the connector may be improved.

In the connector of a battery pack according to an embodiment, a possibility of breakage or damage to the connector during attachment and detachment may be reduced through the pad structure of the connector.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A connector of a battery pack, the connector comprising:
    a plating portion;
    first pads arranged on the plating portion at a first end of the connector, the first pads being spaced apart from each other along a first direction; and
    second pads arranged on the plating portion at a second end of the connector, the second end being opposite the first end along a second direction perpendicular to the first direction, the second pads being spaced apart from each other along the first direction,
    wherein the first pads are in contact with each of first and second open portions on the plating portion, the first and second open portions being spaced apart from each other along the first direction and positioned at respective opposite edges of the first pads, and
    wherein the second pads are in contact with each of third and fourth open portions, the third and fourth open portions being external to the plating portion and positioned at respective opposite edges of the second pads.

2. The connector as claimed in claim 1, further comprising third pads that are arranged toward an inside with respect to the first pads, the third pads being symmetrically arranged at both sides of the first pads, wherein the third pads are each spaced apart from a fifth open portion by a first distance.

3. The connector as claimed in claim 2, wherein each of the third pads is smaller than each of the first pads, and the third pads are engaged with one of outer lines of the first pads.

4. The connector as claimed in claim 2, wherein the third pads are each spaced apart from each of the fifth open portion and a seventh open portion.

5. The connector as claimed in claim 1, further comprising fourth pads arranged toward an inside with respect to the second pads, the fourth pads being symmetrically arranged at both sides of the second pads, wherein the fourth pads are each spaced apart from a sixth open portion by a second distance.

6. The connector as claimed in claim 5, wherein each of the fourth pads

Is smaller than each of the second pads, and the fourth pads are engaged with one of outer lines of the second pads.

7. The connector as claimed in claim 5, wherein the fourth pads are each spaced apart from each of a fifth open portion and the sixth open portion.

8. The connector as claimed in claim 1, wherein the first pads each have a rectangular shape form first and second boundary lines respectively with the first and second open portions.

9. The connector as claimed in claim 1, wherein the second pads have a rectangular shape that form third and fourth boundary lines respectively with the third and fourth open portions.

\* \* \* \* \*